United States Patent
Straub, Jr.

(10) Patent No.: US 8,170,812 B2
(45) Date of Patent: May 1, 2012

(54) METHOD AND SYSTEM FOR DETECTING DEPOSIT BUILDUP WITHIN AN ULTRASONIC FLOW METER

(75) Inventor: Henry Charles Straub, Jr., Sugarland, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 416 days.

(21) Appl. No.: 11/872,839

(22) Filed: Oct. 16, 2007

(65) Prior Publication Data

US 2009/0097354 A1   Apr. 16, 2009

(51) Int. Cl.
G01F 1/66 (2006.01)

(52) U.S. Cl. ............ 702/48; 702/50; 702/100; 73/53.04; 73/54.12; 73/591; 73/861.25; 73/861.27; 73/861.28; 73/32 A (58) Field of Classification Search .................... 702/48, 702/50, 100; 73/53.04, 54.12, 591, 592, 73/861.25, 861.27, 861.28, 32 A
See application file for complete search history.

(56) References Cited

U.S. PATENT DOCUMENTS

| | | | | | |
|---|---|---|---|---|---|
| 6,026,693 | A | * | 2/2000 | Baumoel et al. | 73/861.27 |
| 6,158,288 | A | * | 12/2000 | Smith | 73/861.25 |
| 6,494,105 | B1 | | 12/2002 | Gallagher | |
| 6,816,808 | B2 | | 11/2004 | Freund, Jr. et al. | |
| 6,950,768 | B2 | | 9/2005 | Freund, Jr. et al. | |
| 6,971,259 | B2 | * | 12/2005 | Gysling | 73/32 A |
| 6,992,771 | B2 | * | 1/2006 | Bond et al. | 356/445 |
| 7,059,171 | B2 | * | 6/2006 | Gysling | 73/32 A |
| 7,152,490 | B1 | * | 12/2006 | Freund et al. | 73/861.27 |
| 7,201,065 | B1 | | 4/2007 | Feller | |
| 7,290,455 | B2 | * | 11/2007 | Groeschel | 73/861.28 |
| 2002/0166383 | A1 | * | 11/2002 | Han et al. | 73/610 |
| 2003/0084707 | A1 | * | 5/2003 | Gysling | 73/32 A |
| 2003/0089161 | A1 | * | 5/2003 | Gysling | 73/32 A |
| 2003/0101804 | A1 | | 6/2003 | Zanker | |
| 2003/0136186 | A1 | * | 7/2003 | Gysling | 73/64.53 |
| 2004/0030509 | A1 | * | 2/2004 | Ploug-Soerensen et al. | 702/48 |
| 2006/0156829 | A1 | * | 7/2006 | Konzelmann et al. | 73/861.27 |
| 2006/0272417 | A1 | * | 12/2006 | Zanker et al. | 73/592 |
| 2007/0035212 | A1 | * | 2/2007 | Straub et al. | 310/348 |
| 2007/0039399 | A1 | * | 2/2007 | Groeschel | 73/861.27 |

FOREIGN PATENT DOCUMENTS

| | | |
|---|---|---|
| JP | 2005091332 A | 4/2005 |
| JP | 2005345256 A | 12/2005 |
| WO | 2006130337 A2 | 7/2006 |

OTHER PUBLICATIONS

PCT/US2008/079977 International Search Report, Mar. 25, 2009.
European Patent Application No. 08 83 9856, Supplementary European Search Report dated Mar. 30, 2011, 7 pages.

* cited by examiner

Primary Examiner — Carol Tsai
(74) Attorney, Agent, or Firm — Conley Rose, P.C.

(57) ABSTRACT

Methods and systems for detecting deposit buildup within an ultrasonic flow meter are disclosed. At least some of the illustrative embodiments are ultrasonic flow meters comprising a spool piece configured to couple within a flow of fluid, a first transducer pair mechanically mounted to the spool piece and configured to fluidly couple to the flow of fluids (wherein the first transducer pair comprises an upstream transducer and a downstream transducer in operational relationship to the upstream transducer and defines a first chord there between), and electronics electrically coupled to the first transducer pair. The electronics is configured to detect deposit buildup over an inner surface of the ultrasonic flow meter.

20 Claims, 5 Drawing Sheets

*FIG.5B*

METHOD AND SYSTEM FOR DETECTING DEPOSIT BUILDUP WITHIN AN ULTRASONIC FLOW METER

BACKGROUND

After hydrocarbons have been removed from the ground, the fluid stream (such as crude or natural gas) is transported from place to place via pipelines. It is desirable to know with accuracy the amount of fluid flowing in the stream, and particular accuracy is demanded when the fluid is changing hands, or "custody transfer." Even where custody transfer is not taking place, however, measurement accuracy is desirable.

Ultrasonic flow meters may be used in situations such as custody transfer. In an ultrasonic flow meter, acoustic signals are sent back and forth across the fluid stream to be measured between one or more pairs of transducers. Each transducer pair is positioned within the meter body, or spool piece, such that an acoustic signal traveling from one transducer to the other intersects fluid flowing through the meter at an angle. Electronics within the meter measure the difference between the transit time required for an acoustic signal to travel from the downstream transducer to the upstream transducer and the transit time required for an acoustic signal to travel from the upstream transducer to the downstream transducer. The difference in the transit times is then used to calculate the average velocity and the volumetric flow rate of fluid passing through the meter.

During operation of an ultrasonic flow meter in a pipeline, deposits may form over the inner surfaces of the meter. For example, liquid ultrasonic flow meters may be used to meter crude oils that often contain waxes. Over time, wax deposits build up on the inner surfaces of the meter. The deposit buildup may cause inaccuracies in measured transit times for the acoustic signals and reduce the effective cross-sectional flow area of the meter, both of which create error in the computed volumetric flow rate through the meter.

SUMMARY

The problems noted above are addressed, at least in part, by a method and system for detecting deposit buildup within an ultrasonic flow meter. At least some of the illustrative embodiments are systems comprising an ultrasonic flow meter and electronics. The ultrasonic flow meter comprises a spool piece configured to couple within a flow of fluid, a first transducer pair mechanically mounted to the spool piece and configured to fluidly couple to the flow of fluid, and electronics electrically coupled to the first transducer pair. The first transducer pair comprises an upstream transducer and a downstream transducer in operational relationship to the upstream transducer and defines a first chord there between. The electronics is configured to determine diagnostic data based on acoustic signals transmitted between the first transducer pair, including a speed of sound through the fluid. The electronics is further configured to detect deposit buildup over an inner surface of the spool piece based on a trend of the speed of sound through the fluid.

Other illustrative embodiments are methods comprising determining diagnostic data based on acoustic signals transmitted between a transducer pair of an ultrasonic flow meter, including a speed of sound through a fluid flowing through the ultrasonic flow meter. These methods further comprise trending the speed of sound through the fluid with time and detecting deposit thickness over an inner surface of the ultrasonic flow meter using the trended speed of sound through the fluid.

Still other illustrative embodiments are computer-readable media comprising a plurality of instructions that, when executed by a processor, cause the processor to deposit buildup within an ultrasonic flow meter using a trend of diagnostic data based on acoustic signals transmitted between a transducer pair, the diagnostic data comprising a speed of sound through a fluid flowing through the ultrasonic flow meter.

The disclosed systems and methods comprise a combination of features and advantages that overcome deficiencies of the prior art. The various characteristics described above, as well as other features, will be readily apparent to those skilled in the art upon reading the following detailed description, and by referring to the accompanying drawings.

BRIEF DESCRIPTION OF THE DRAWINGS

For a detailed description of the various embodiments, reference will now be made to the accompanying drawings in which.

NOTATION AND NOMENCLATURE

Certain terms are used throughout the following description and claims to refer to particular system components. This document does not intend to distinguish between components that differ in name but not function.

In the following discussion and in the claims, the term "comprises" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

DETAILED DESCRIPTION

Figure 1:
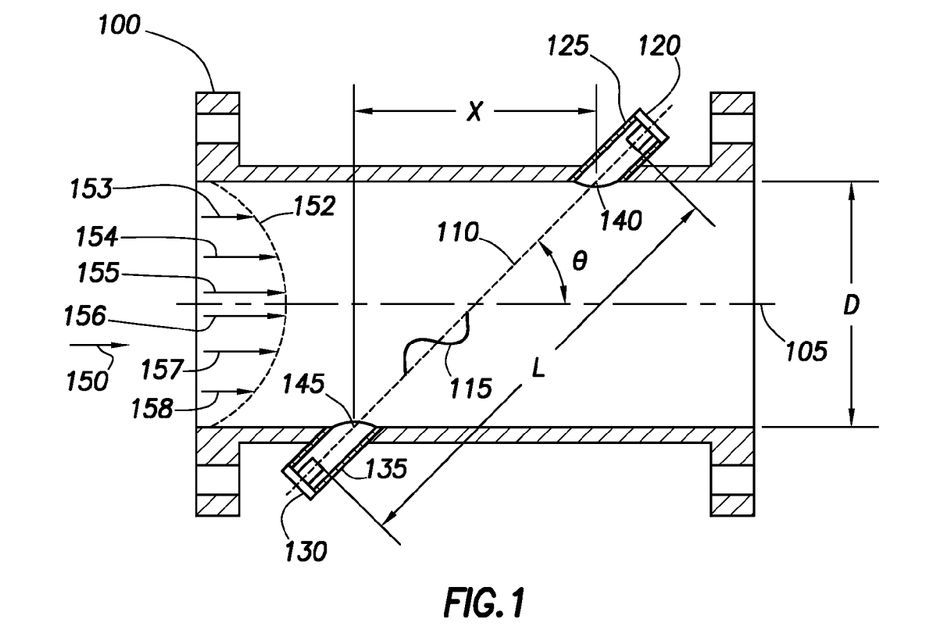
FIG. 1 illustrates a cut-away top view of an ultrasonic flow meter.

FIG. 1 illustrates an ultrasonic flow meter suitable for measuring fluid flow, such as liquids or gases, in accordance with at least some embodiments. Spool piece 100, suitable for placement between sections of a pipeline, has a predetermined size and defines a measurement section. A pair of transducers 120 and 130, and their respective housings 125 and 135, are located along the length of spool piece 100. Transducers 120 and 130 are ultrasonic transceivers, meaning that they both generate and receive ultrasonic signals. "Ultrasonic" in this context refers to acoustic signals, in some embodiments having frequencies above about 20 kilohertz. In some embodiments, the ultrasonic signals may have a frequency of approximately 125 kilohertz (for gas meters), and 1 megahertz (for liquid meters).

Regardless of the frequency, acoustic signals may be generated and received by a piezoelectric element in each transducer. To generate an ultrasonic signal, the piezoelectric element is stimulated electrically, and it responds by vibrating. The vibration of the piezoelectric element generates an ultrasonic signal that travels across the spool piece 100 through the fluid to the corresponding transducer of the transducer pair. Upon being struck by an ultrasonic signal, the receiving piezoelectric element vibrates and generates an electrical signal that is detected, digitized, and analyzed by electronics associated with the meter.

A path 110, sometimes referred to as a "chord," exists between transducers 120 and 130 at an angle θ to a centerline 105. The length of "chord" 110 is the distance between the face of transducer 120 to the face of transducer 130. Points 140 and 145 define the locations where acoustic signals generated by transducers 120 and 130 enter and leave fluid flowing through the spool piece 100. The position of transducers 120 and 130 may be defined by the angle θ, by a first length L measured between transducers 120 and 130, a second length X corresponding to the axial distance between points 140 and 145, and a third length D corresponding to the pipe or spool piece diameter. In most cases distances D, X and L are precisely determined during meter fabrication. Further, transducers such as 120 and 130 are usually placed a specific distance from points 140 and 145, respectively, regardless of meter size (i.e. spool piece diameter).

Initially, downstream transducer 120 generates an ultrasonic signal that propagates to and strikes the upstream transducer 130. Some time later, the upstream transducer 130 generates a return ultrasonic signal that propagates to and strikes the downstream transducer 120. Thus, the transducers 120 and 130 play "pitch and catch" with ultrasonic signals 115 along chordal path 110. During operation, this sequence may occur thousands of times per minute for each transducer pair.

A fluid flows in the spool piece 100 in a direction 150 with a velocity profile 152. Velocity vectors 153-158 illustrate that the velocity through spool piece 100 increases toward centerline 105. The transit time of the ultrasonic signal 115 between transducers 120 and 130 depends in part upon whether the ultrasonic signal 115 is traveling upstream or downstream with respect to the fluid flow. A transit time for an ultrasonic signal 115 traveling downstream (i.e. in the same direction as the flow) is less than the transit time when traveling upstream (i.e. against the flow). The upstream and downstream transit times can be used to calculate the average velocity along the chordal path 110, and may also be used to calculate the speed of sound in the fluid flow. Given the cross-sectional measurements of the meter carrying the fluid and the average velocity, the volume of fluid flowing through the spool piece 100 may be calculated.

Figure 2:
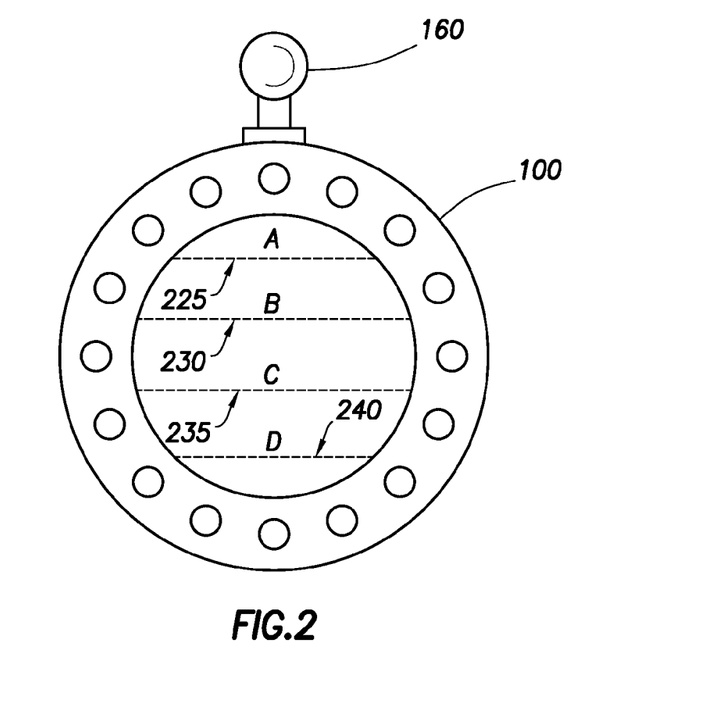
FIG. 2 illustrates an end view of an ultrasonic flow meter in accordance with at least some of the embodiments comprising a spool piece and chordal paths A-D.

To more precisely determine the average velocity over the meter cross-section, ultrasonic flow meters comprise a plurality of paths. FIG. 2 illustrates a multi-path ultrasonic flow meter. In these embodiments spool piece 100 comprises a chordal path A 225, a chordal path B 230, a chordal path C 235, and a chordal path D 240 at varying levels through the fluid flow. In alternative embodiments, the multi-path flow meter may comprise a different number of chordal paths. Each chordal path A-D corresponds to two transducers behaving alternately as a transmitter and a receiver. Also shown are control electronics 160, which acquire and process the data from the four chordal paths A-D. Hidden from view in FIG. 2 are the four pairs of transducers that correspond to chordal paths A-D.

Figure 3:
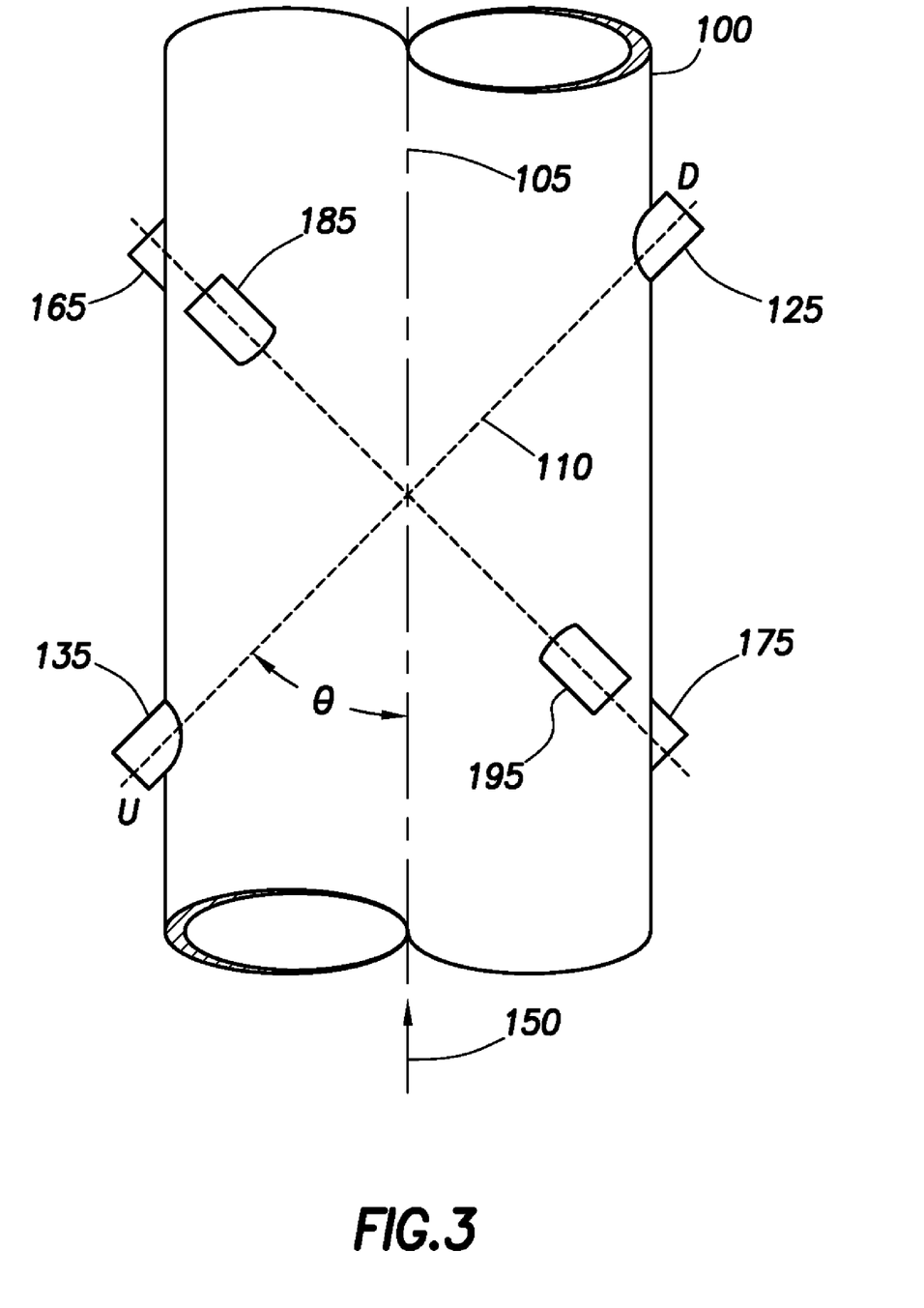
FIG. 3 illustrates a top view of an ultrasonic flow meter in accordance with at least some embodiments comprising a spool piece housing several pairs of transducers.

The arrangement of the four pairs of transducers may be more easily understood by reference to FIG. 3. Four pairs of transducer ports are mounted on spool piece 100. Each pair of transducer ports corresponds to a single chordal path 110 of FIG. 2. The spool piece 100 has mounted thereon a first pair of transducer ports 125 and 135 as well as associated transducers. Another pair of transducer ports comprising ports 165 and 175 (only partially in view) as well as associated transducers is mounted so that its chordal path loosely forms an "X" with respect to the chordal path 110 of transducer ports 125 and 135. Similarly, transducer ports 185 and 195 are placed parallel to transducer ports 165 and 175 but at a different "level" (i.e., a different radial position in the pipe or meter spool piece). Not explicitly shown in FIG. 3 is a fourth pair of transducers and transducer ports.

Taking FIGS. 2 and 3 together, the pairs of transducers are arranged such that the upper two pairs of transducers corresponding to chords A and B form an "X", and the lower two pairs of transducers corresponding to chords C and D also form an "X". Based on the transit times, the flow velocity of the fluid may be determined at each chord A-D to obtain chordal flow velocities, and the chordal flow velocities may be combined to determine an average flow velocity over the entire pipe or meter spool piece 100. The volumetric flow rate through the meter spool piece 100 may then be determined as the product of the average flow velocity and the cross-sectional area of the meter spool piece 100.

The chordal flow velocities are based on a batch of transit times received from the four pairs of transducers. For a chord i, the batch of transit times comprise a batch of a difference $\Delta T_i$ in transit time between an upstream transit time $T_{1,i}$ and a downstream transit time $T_{2,i}$ generated by substantially the following equation:

$$\Delta T = T_{1,i} - T_{2,i} \tag{1}$$

A batch of 20 values of $\Delta T_i$ may be used to determine an average value of $\Delta T_i$. In alternative embodiments, a different number of values of $\Delta T_i$ may be used.

Based on the average value of $\Delta T_i$, an average chordal flow velocity $V_i$ may be determined as defined by substantially the following equation:

$$V_i = \frac{L_i^2}{2X_i} \cdot \frac{\Delta T_i}{T_{1,i} T_{2,i}} \tag{2}$$

wherein i is indicative of the particular chord, $V_i$ is the chordal flow velocity being determined (i.e., $V_A$, $V_B$, $V_C$, or $V_D$ corresponding to chords A-D, respectively), $L_i$ is the distance or chord length between the transducers, and $X_i$ is the axial distance in the flow. Further, based on the average chordal velocities $V_i$, an average flow velocity V of the flow of fluids through the pipe or meter spool piece 100 may be determined by substantially the following equation:

$$V = \sum_i W_i V_i \tag{3}$$

wherein $W_i$ is a chord-dependent weighting factor for chord i.

Using the average flow velocity V, the volumetric flow rate Q through the meter spool piece 100 may be determined by:

$$Q = VA_c \quad (4)$$

wherein $A_c$ is the cross-sectional flow area of the meter spool piece 100. The cross-sectional flow area $A_c$ may be determined by:

$$A_c = \frac{\pi D^4}{4} \quad (5)$$

wherein D is the inner diameter of the meter spool piece 100 and is usually measured when the spool piece 100 is first fabricated.

During ultrasonic flow meter operation, electronics associated with the meter perform a number of functions, which may include causing a transducer to fire, receiving output from one or more transducers, and computing the average chordal velocity $V_i$ for each chord, the average flow velocity V and the volumetric flow rate Q through the meter. Parameters calculated by the electronics may then be transmitted to electronic device(s) external to the meter, such as a Supervisory Control and Data Acquisition (SCADA) system, and used as input for further computations. Alternatively, all computations may be performed by electronics associated with the meter or by electronics remote to the meter.

As fluid passes through the meter spool piece, deposits may begin to form over its inner surfaces. Over time, the deposit buildup can cause errors in the computed average chordal velocity $V_i$, a function of measured transit times $T_{1,i}$, $T_{2,i}$, the cross-sectional flow area $A_c$ of the meter, and therefore the computed volumetric flow rate Q through the meter. As deposits buildup, an acoustic signal fired by a transducer must pass through deposit material before being received by another transducer. Thus, measured transit times $T_{1,i}$, $T_{2,i}$ are affected by the deposit buildup, creating an error in the computed average chordal velocity $V_i$. Moreover, deposit buildup reduces the effective cross-sectional area $A_c$ of the meter. Both of these errors create error in the computation of the volumetric flow rate Q through the meter.

The inability to detect and quantify deposit buildup over the inner surfaces of an ultrasonic flow meter necessitates maintenance of the meter at regular intervals. This often leads to time consuming and costly unneeded maintenance operations. Furthermore, in the related art, there is no way to adjust reliably the computed volumetric flow rate to account for deposit buildup between maintenance procedures. The present disclosure is directed to methods and systems for detecting and quantifying deposit buildup in ultrasonic flow meters. The disclosed methods and systems provide diagnostic data, both measured and computed, that permits maintenance to reduce deposit buildup when needed, rather than on fixed schedule. In the event that maintenance procedures are not immediately performed, the disclosed methods and systems also permit the computed volumetric flow rate to be corrected to account for deposit buildup.

In accordance with some embodiments, errors in transit times $T_{1,i}$, $T_{2,i}$, and thus deposit buildup, may be detected using a function η (Eta). The background and derivation of error indicator η are presented in U.S. Pat. No. 6,816,808, which is incorporated herein by reference. For two chords A and B having substantially different chord lengths $L_A$ and $L_B$, respectively, error indicator $\eta_{AB}$ is expressed:

$$\eta_{AB} = \frac{L_B L_A}{L_B - L_A} \cdot \frac{c_B - c_A}{c_B c_A} \quad (6)$$

where $c_A$ is the computed speed of sound through fluid along chord A and $c_B$ is the computed speed of sound through fluid along chord B. Similar expressions may be written for other pairs chords having substantially different lengths, such as for chords B and D, chords C and A, and chords C and D of FIG. 2.

The speed of sound $c_A$ for chord A is determined by:

$$c_A = \frac{L_A}{2} \cdot \frac{T_{1,A} + T_{2,A}}{T_{1,A} T_{2,A}} \quad (7)$$

where $T_{1,A}$ is the upstream transit time along chord A and $T_{2,A}$ is the downstream transit time along chord A. The speed of sound associated with chord B, as well as other chords, may be expressed similarly.

If the speed of sound through fluid in the meter is homogenous and no errors occur in the measurement of transit times $T_{1,A}$, $T_{2,A}$, $T_{1,B}$ and $T_{2,B}$, $\eta_{AB}$ will be zero. However, if there is an error in any of these measured transit times, $\eta_{AB}$ will be nonzero. As discussed above, deposit buildup may create errors in measured transit times, and thus cause $\eta_{AB}$ to be nonzero. Therefore, by monitoring the value of $\eta_{AB}$ over time, deposit buildup within the ultrasonic flow meter may be detected.

When calculating $\eta_{AB}$ over time for the purpose of detecting deposit buildup, the fluid flow regime should be considered. Temperature stratification may occur, meaning fluid temperature is nonuniform within the meter, when there is little to no fluid flow through an ultrasonic flow meter. For example, fluid near the top of the meter may be warmer than fluid near the meter base. Because the speed of sound through the fluid is temperature dependent, the speed of sound within the fluid will not be homogeneous in the presence of temperature stratification. Moreover, differing speeds of sound through the fluid will cause a variation in the value of $\eta_{AB}$ from one chord to the next.

Temperature stratification may be minimized, however, when the fluid is well mixed, such as when there is turbulent fluid flow through the meter. Therefore, when calculating $\eta_{AB}$ over time for the purpose of detecting deposit buildup, it is preferable to measure transit times $T_{1,A}$, $T_{2,A}$, $T_{1,B}$ and $T_{2,B}$ when fluid is flowing through the ultrasonic flow meter.

Figure 4:
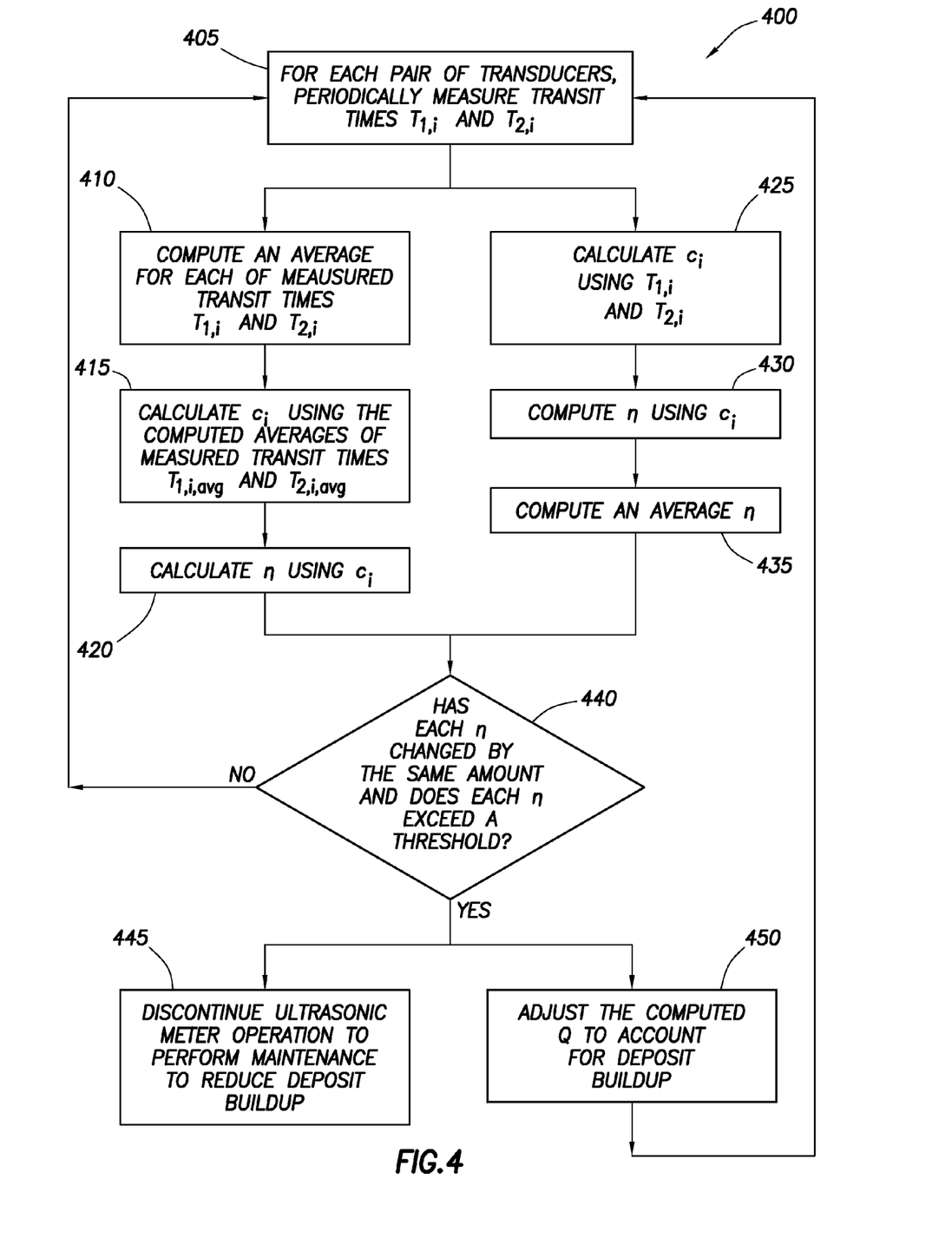
FIG. 4 depicts an illustrative method embodiment for detecting deposit buildup.

FIG. 4 shows a flow diagram for an illustrative method of detecting deposit buildup within an ultrasonic flow meter. The method 400 begins when electronics associated with the meter periodically measure transit times $T_{1,i}$, $T_{2,i}$ between at least two pairs of transducers positioned within the meter (block 405). In some embodiments, transit times $T_{1,i}$, $T_{2,i}$ may be measured for all transducer pairs, while in other embodiments transit times $T_{1,i}$, $T_{2,i}$ may be measured for only select pair(s).

Error indicator η may be calculated for any two pairs of transducers having substantially different chord lengths therebetween and for which transit times $T_{1,i}$, $T_{2,i}$ are measured. For example, there are four pairs of transducers contained within the ultrasonic flow meter depicted in FIG. 2. If transit times $T_{1,i}$, $T_{2,i}$ are measured for each pair of transducers, then η may then be calculated for pairs of transducers associated with chords A and B, B and D, A and C, and C and D.

In some embodiments, transit times $T_{1,i}$, $T_{2,i}$ are repeatedly measured over a period of time and then averaged over that time period, thereby yielding averaged transit times $T_{1,i,avg}$ and $T_{2,i,avg}$ (block 410). The averaged transit times $T_{1,i,avg}$, $T_{2,i,avg}$ may then be used to calculate the speed of sound $c_i$ by substituting the averaged transit times $T_{1,i,avg}$, $T_{2,i,avg}$ and chord length $L_i$ into equation (7) (block 415). In turn, the speed of sound $c_i$ and appropriate chord lengths are then substituted into equation (6) to calculate $\eta$ (block 420). In a sense, the computed $\eta$ is an averaged $\eta$, or $\eta_{avg}$, because it is determined using averaged transit times $T_{1,i,avg}$, $T_{2,i,avg}$.

Alternatively, the speed of sound $c_i$ may be calculated by substituting the measured transit times $T_{1,i}$, $T_{2,i}$ and chord length $L_i$ into equation (7) (block 425). In turn, the speed of sound $c_i$ and appropriate chord lengths are then substituted into equation (6) to calculate $\eta$ (block 430). These calculations may be repeated over a period of time and the computed values of $\eta$ averaged, thereby yielding an averaged $\eta$, or $\eta_{avg}$ (block 435).

Next, each calculated $\eta_{avg}$ may be evaluated to determine whether there is detectable deposit buildup within the ultrasonic flow meter (block 440). One basis for determining that deposit buildup exists is the assumption that each calculated $\eta_{avg}$ will drift by substantially the same amount and exceed a pre-defined threshold.

If no deposit buildup is detected, no remedial action may be required at that time. Electronics associated with the ultrasonic flow meter may continue to sample transit times $T_{1,i}$, $T_{2,i}$ and compute $\eta_{avg}$ for the two or more transducer pairs uninterrupted until deposit buildup is detected. In the event that deposit buildup is detected, remedial action may be taken at that time. Depending on the circumstances, operation of the ultrasonic flow meter may be discontinued to allow for maintenance to reduce, or eliminate, the deposit buildup (block 445). Alternatively, electronics may perform additional computations to determine an adjusted or corrected volumetric flow rate through the meter that accounts for the deposit buildup (block 450).

The ability to detect deposit buildup in accordance with methods disclosed herein, including method 400, may permit maintenance of the ultrasonic flow meter when needed, rather than on a fixed schedule. Furthermore, the ability to quantify the deposit buildup and account for that buildup by correcting computed volumetric flow rates through the meter may allow maintenance to be delayed indefinitely. In at least some embodiments, $\eta$ provides the basis for quantifying deposit buildup and correcting volumetric flow rates through the meter.

Referring again equation (6), $\eta_{AB}$ is a function of the speed of sound $c_A$ and the speed of sound $c_B$. Assuming there is a timing error $\Delta T_A$ in the measurement of either transit time $T_{1,A}$ or $T_{2,A}$ due to deposit buildup, the resulting error $\Delta c_A$ in the computed speed of sound $c_A$ is:

$$\Delta c_A = -\frac{c^2}{L_A}\Delta T_A \tag{8}$$

Thus, the speed of sound $c_A$ for chord A may be written as:

$$c_A = c + \Delta c_A = c - \frac{c^2}{L_A}\Delta T_A \tag{9}$$

Similar expressions may be written for other chords, such as chords B, C and D of FIG. 2.

By substituting equation (9) and a similar expression for chord B into equation (6) and neglecting higher order terms, meaning the product of $\Delta T_A$ and $\Delta T_B$, $\eta_{AB}$ may be expressed as:

$$\eta_{AB} = \frac{L_B \Delta T_A - L_A \Delta T_B}{L_B - L_A} \tag{10}$$

If deposits form on the faces of transducers at opposite ends of a chord, such deposits will cause an error in the fluid speed of sound c. One way to quantify this error is to consider that the deposits cause an error in the measured transit time T. Assuming the deposit material has a speed of sound $c_{deposit}$ and the deposit on each transducer face has a thickness $t_{deposit}$, the error $\Delta T$ in transit time caused by deposit buildup may be defined as:

$$\Delta T = 2 t_{deposit} \left( \frac{1}{c_{deposit}} - \frac{1}{c} \right) \tag{11}$$

As shown by equation (11), the error $\Delta T$ in transit time caused by deposit buildup depends on the deposit thickness $t_{deposit}$, the speed of sound through the fluid c, and the speed of sound through the deposit material $c_{deposit}$, but not chord length. Moreover, assuming deposits buildup uniformly within the ultrasonic flow meter, the error $\Delta T$ in transit time caused by deposit buildup is independent of the chord. Thus, $\Delta T_A$ and $\Delta T_B$ of equation (10) are independent of chords A and B, respectively, and may be designated simply $\Delta T$. Equation (10) then simplifies to:

$$\eta_{AB} = \Delta T \tag{12}$$

Combining equations (11) and (12), $\eta_{AB}$ and the error $\Delta T$ in transit time due to deposit buildup may be expressed in terms of the deposit thickness $t_{deposit}$:

$$\eta_{AB} = \Delta T = 2 t_{deposit} \left( \frac{1}{c_{deposit}} - \frac{1}{c} \right) \tag{13}$$

Through algebraic manipulation of equation (13), the deposit thickness $t_{deposit}$ may be expressed:

$$t_{deposit} = \frac{\Delta T}{2} \cdot \frac{c c_{deposit}}{c - c_{deposit}} \tag{14}$$

As described above in reference to FIG. 4, $\eta_{AB}$ may be calculated using measured transit times $T_{1,i}$, $T_{2,i}$. Having determined $\eta_{AB}$ and knowing from equation (13) that $\eta_{AB}$ equals the timing error $\Delta T$, the deposit thickness $t_{deposit}$ may then be determined using equation (14). Thus, equation (14) permits deposit buildup within an ultrasonic flow meter to be quantified.

In some embodiments, the decision to perform maintenance on the ultrasonic flow meter to reduce deposit buildup may depend on the deposit thickness $t_{deposit}$. For example, a threshold value may be defined such that maintenance is performed when the deposit thickness $t_{deposit}$ exceeds that threshold. In the event that maintenance is not performed to reduce or eliminate deposit buildup, the volumetric flow rate through the meter may be corrected to account for the deposit buildup.

The volumetric flow rate through the meter is given by:

$$Q = VA_c \quad (15)$$

where $A_c$ is the cross-sectional flow area and V is the average flow velocity. As previously discussed, deposit buildup will create errors in both the average flow velocity V and the cross-sectional flow area $A_c$. Thus, the relative uncertainty in the volumetric flow rate $\Delta Q/Q$ may be expressed by:

$$\frac{\Delta Q}{Q} = \frac{\Delta V}{V} + \frac{\Delta A_c}{A_c} \quad (16)$$

where $\Delta V/V$ and $\Delta A_c/A_c$ are the relative uncertainties in the average flow velocity V and cross-sectional flow area $A_c$, respectively. To determine the relative uncertainty in the volumetric flow rate $\Delta Q/Q$ and thus the error $\Delta Q$ created in the volumetric flow rate Q caused by the deposit buildup, the relative uncertainties in the average flow velocity and cross-sectional flow area $\Delta V/V$, $\Delta A_c/A_c$, respectively, are evaluated.

The cross-sectional flow area $A_c$ is:

$$A_c = \frac{\pi D^2}{4} \quad (17)$$

wherein D is the inner diameter of the meter spool piece measured in the absence of deposit buildup. Deposit buildup reduces the effective inner diameter of the meter spool piece. Thus, the relative uncertainty in the cross-sectional flow area $\Delta A_c/A_c$ may be expressed as:

$$\frac{\Delta A_c}{A_c} = \frac{1}{A_c} \cdot \frac{\partial A_c}{\partial D} \Delta D \quad (18)$$

Substituting for $A_c$ in terms of D using equation (17) and noting that $\Delta D$ equals $-2t_{deposit}$, the relative uncertainty in the cross-sectional flow area $\Delta A_c/A_c$ is:

$$\frac{\Delta A_c}{A_c} = -\frac{4 t_{deposit}}{D} \quad (19)$$

The average flow velocity V is given by:

$$V = \sum_i W_i V_i \quad (20)$$

wherein $W_i$ is a chord-dependent weighting factor for chord i. Thus, the relative uncertainty in the average flow velocity $\Delta V/V$ may be expressed as:

$$\frac{\Delta V}{V} = \sum_i W_i \frac{\Delta V_i}{V_i} \quad (21)$$

The average chordal flow velocity $V_i$ is given by:

$$V_i = \frac{L_i^2}{2 X_i} \cdot \frac{T_{1,i} - T_{2,i}}{T_{1,i} T_{2,i}} \quad (22)$$

wherein $L_i$ is the length of chord i, $X_i$ is the axial component of $L_i$, $T_{1,i}$ is the upstream transit time (meaning transit time for an acoustic signal to travel from the downstream transducer along chord i to the upstream transducer), and $T_{2,i}$ is the downstream transit time. Thus, the relative uncertainty in the flow velocity $\Delta V_i/V_i$ for chord i may be expressed as:

$$\frac{\Delta V_i}{V_i} = \frac{1}{V_i} \left( \frac{\partial V_i}{\partial X_i} \Delta X_i + \frac{\partial V_i}{T_{1,i}} \Delta T + \frac{\partial V_i}{\partial T_{2,i}} \Delta T \right) \quad (23)$$

where the errors in transit times $T_{1,i}$ and $T_{2,i}$ are $\Delta T$, as previously discussed. Using equation (22), the above expression may be simplified:

$$\frac{\Delta V_i}{V_i} = -\frac{\Delta X_i}{X_i} - \frac{2c}{L_i} \Delta T \quad (24)$$

wherein c is the speed of sound in the fluid.

Figure 5A:
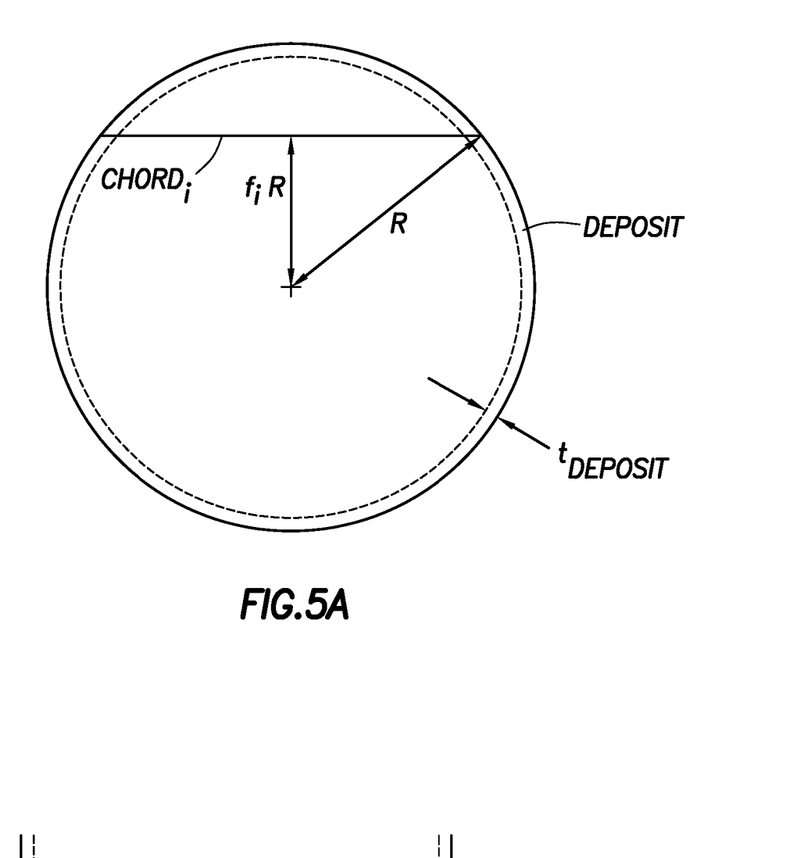
FIGS. 5A and 5B schematically depict radial and axial cross-sectional views of an ultrasonic flow meter with deposit buildup.
Figure 5B:
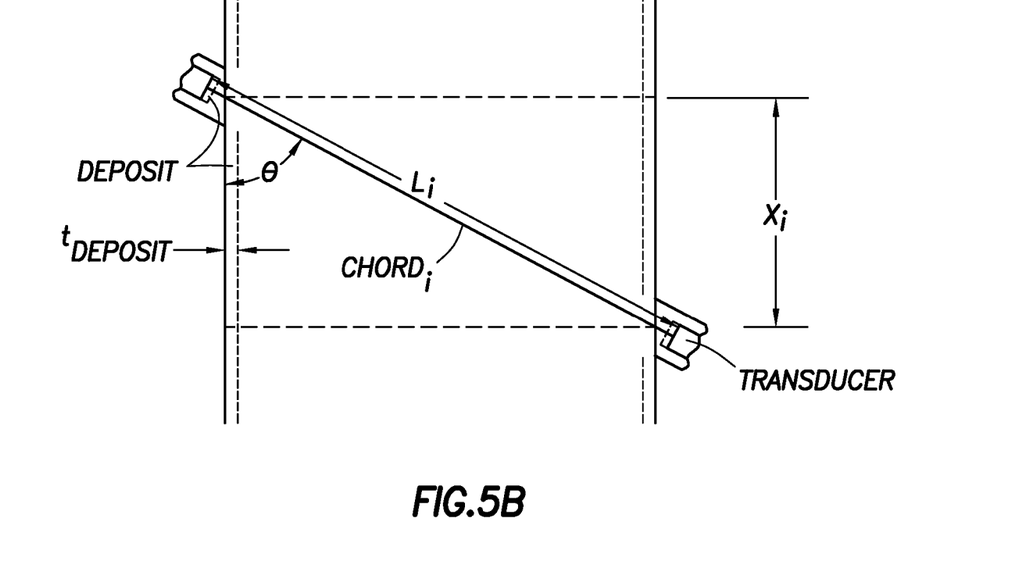

The axial component $X_i$ is given by:

$$X_i = \frac{D\sqrt{1 - f_i^2}}{\tan \theta} \quad (25)$$

where $\theta$ is the angle chord i makes with respect to the flow direction and $f_i$ is the relative fractional distance that the measuring plane of chord i is from the center plane of the meter. FIGS. 5A and 5B schematically illustrate the relative fractional distance $f_i$ and the axial extent $X_i$ for a chord i having chord length $L_i$. Deposit buildup creates errors in the effective diameter of the meter and the relative fractional distance $f_i$ that the measuring plane of chord i is from the center plane of the meter $f_i$. Thus, the relative uncertainty in axial extent $\Delta X_i/X_i$ may be expressed by:

$$\frac{\Delta X_i}{X_i} = \frac{1}{X_i} \left( \frac{\partial X_i}{\partial D} \Delta D + \frac{\partial X_i}{\partial f_i} \Delta f_i \right) \quad (26)$$

As before, $\Delta D$ may be expressed in terms of deposit thickness $t_{deposit}$:

$$\Delta D = -2 t_{deposit} \quad (27)$$

Also, the error in the relative fractional distance $\Delta f_i/f_i$ is:

$$\frac{\Delta f_i}{f_i} = \frac{2 t_{deposit}}{D} \quad (28)$$

Substituting for $\Delta D$ and $\Delta f_i/f_i$ in equation (26) using equations (27) and (28), the relative uncertainty in axial extent $\Delta X_i/X_i$ is:

$$\frac{\Delta X_i}{X_i} = -\frac{2t_{deposit}}{D(1-f_i^2)} \quad (29)$$

Further, substituting for $\Delta X_i/X_i$ in equation (24) using equation (29), the relative uncertainty in the flow velocity $\Delta V_i/V$ for chord i may be simplified:

$$\frac{\Delta V_i}{V_i} = 2t_{deposit}\left(\frac{1}{D(1-f_i^2)} - \frac{2}{L_i} \cdot \frac{c - c_{deposit}}{c_{deposit}}\right) \quad (30)$$

As described in reference to FIG. 4, $\eta_{AB}$ may be calculated using measured transit times $T_{1,i}$, $T_{2,i}$. Using equation (13), the deposit thickness $t_{deposit}$ may be determined as a function of $\eta_{AB}$. The deposit thickness $t_{deposit}$ may then be used as input to equations (19) and (30) to determine $\Delta A_c/A_c$ and $\Delta V_i/V_i$, respectively. Finally, the relative error in the volumetric flow rate $\Delta Q/Q$ may be evaluated using equation (16).

Accounting for the deposit buildup, the corrected volumetric flow rate $Q_c$ through the meter is:

$$Q_c = Q + \Delta Q \quad (31)$$

wherein Q is the volumetric flow rate through the meter in the absence of deposit buildup and may be determined using equation (15).

Figure 6:
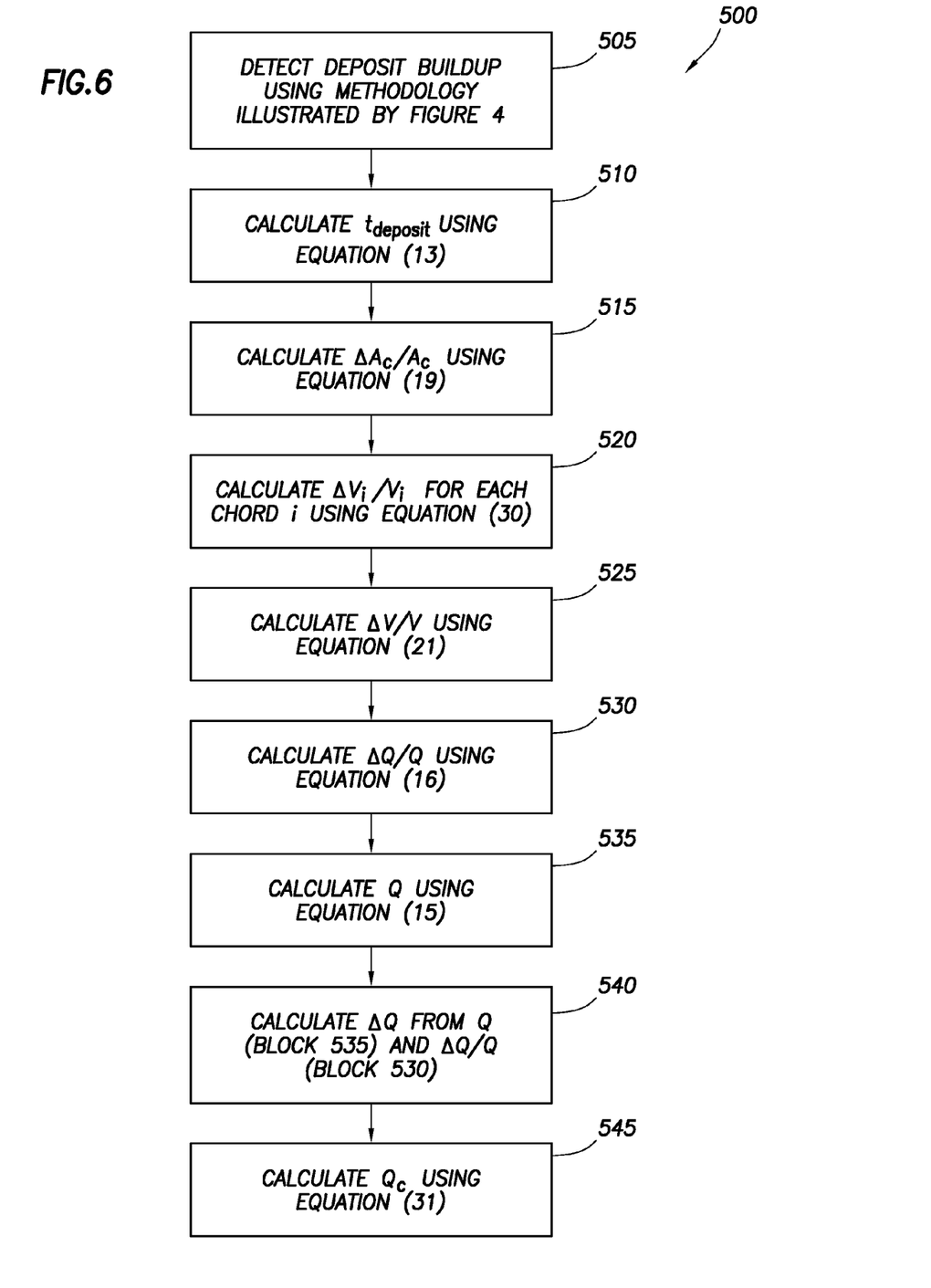
FIG. 6 depicts an illustrative method embodiment for quantifying deposit buildup and correcting the volumetric flow rate to account for the deposit buildup.

FIG. 6 shows a flow diagram for an illustrative method 500 for quantifying deposit buildup within an ultrasonic flow meter and correcting the volumetric flow rate through the meter to account for the deposit buildup. The method 500 begins with detecting deposit buildup in accordance with method 400 discussed above in reference to FIG. 4 (block 505). One product of method 400 is $\eta_{avg}$, which may then be substituted into equation (13) and the deposit thickness $t_{deposit}$ calculated (block 510).

Next, method 500 uses the deposit thickness $t_{deposit}$ to calculate the corrected volumetric flow rate $Q_c$ through the meter in a series of steps. The relative uncertainty in cross-sectional flow area $\Delta A_c/A_c$ is calculated using equation (19) (block 515). The relative uncertainty in the average chordal flow velocity $\Delta V_i/V_i$ for each chord i is calculated using equation (30) (block 520). The computed values of $\Delta V_i/V_i$ for all chords i are then substituted into equation (21) to determine the relative uncertainty for the average flow velocity $\Delta V/V$ (block 525). The relative uncertainty in the volumetric flow rate $\Delta Q/Q$ is determined from the computed values of $\Delta A_c/A_c$ and $\Delta V/V$ using equation (16) (block 530).

The volumetric flow rate Q through the meter in the absence of deposit buildup may be determined using equation (15) (block 535). The computed values of $\Delta Q/Q$ and Q may then be combined to arrive at the error in the volumetric flow rate due to deposit buildup $\Delta Q$ (block 540). Finally, the corrected volumetric flow rate $Q_c$ through the meter may be determined using equation (31) (block 545).

From the description provided herein, those skilled in the art are readily able to combine the methods as described to create software that when combined with appropriate general purpose or special purpose computer hardware may be used to create a computer system and/or computer subcomponents embodying the invention, to create a computer system and/or computer subcomponents for carrying out the method of the invention, and/or to create a computer-readable media for storing a software program to implement the method aspects of the invention. Using such software, the methods described herein may be executed on a periodic basis or as needed.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system comprising:
   an ultrasonic flow meter comprising:
      a spool piece configured to couple within a flow of fluid; and
      a first transducer pair mechanically mounted to the spool piece and configured to fluidly couple to the flow of fluid, the first transducer pair comprising an upstream transducer and a downstream transducer in operational relationship to the upstream transducer and defining a first chord there between; and
   electronics electronically coupled to the first transducer pair, the electronics configured to:
      determine diagnostic data based on acoustic signals transmitted between the first transducer pair, the diagnostic data comprising a speed of sound through the fluid; and
      detect deposit buildup over an inner surface of the spool piece based on a trend of the speed of sound through the fluid.

2. The system of claim 1 wherein at least some of the electronics are contained within the meter.

3. The system of claim 1 wherein at least some of the electronics are remote to the meter.

4. The system of claim 1 wherein the electronics is further configured to determine the thickness of the deposit buildup.

5. The system of claim 4 wherein the electronics is further configured to generate a signal when the deposit thickness exceeds a threshold value.

6. The system of claim 1 wherein the electronics is further configured to determine the change in the volumetric flow rate through the meter caused by the deposit buildup.

7. The system of claim 1 wherein the diagnostic data further comprises transit times between the first transducer pair and wherein the electronics is further configured to calculate the speed of sound through the fluid.

8. The system of claim 1 wherein the electronics is further configured to store the diagnostic data.

9. A method comprising:
   determining, by a processor, diagnostic data based on acoustic signals transmitted between a transducer pair of an ultrasonic flow meter, the diagnostic data comprising a speed of sound through a fluid flowing through the ultrasonic flow meter;
   trending, by the processor, the speed of sound through the fluid with time; and
   detecting, by the processor, deposit buildup over an inner surface of the ultrasonic flow meter using the trended speed of sound through the fluid.

10. The method of claim 9 further comprising determining the thickness of the deposit buildup.

11. The method of claim 10 further comprising generating a signal when the deposit thickness exceeds a threshold value.

12. The method of claim 10 wherein the deposit thickness is determined by substantially the following equation:

$$t_{deposit} = \frac{\Delta T}{2} \cdot \frac{c_{fluid} c_{deposit}}{c_{fluid} - c_{deposit}}$$

wherein $\Delta T$ is a timing error caused by the deposit buildup; $c_{deposit}$ is the speed of sound through the deposit; and $c_{fluid}$ is the speed of sound in a fluid flowing through the ultrasonic flow meter.

13. The method of claim 9 further comprising calculating the change in a volumetric flow rate of a fluid passing through the meter caused by the deposit buildup.

14. The method of claim 13 wherein the change in the volumetric flow rate is determined by substantially the following equation:

$$\Delta Q/Q = \Delta V/V + \Delta A_c/A_c$$

wherein Q, V and $A_c$ are the volumetric flow rate, the average flow velocity associated with the first transducer pair and the cross-sectional flow area, respectively, in the absence of deposit buildup; and $\Delta Q$, $\Delta V$ and $\Delta A_c$ are the error in the volumetric flow rate, the error in the average flow velocity associated with the first transducer pair and the error in the cross-sectional flow area, respectively, caused by the deposit buildup.

15. The method of claim 14 wherein $\Delta A_c/A_c$ is determined by substantially the following equation:

$$\Delta A_c/A_c = -4 t_{deposit}/D$$

wherein D is the inner diameter of the ultrasonic flow meter in the absence of deposit buildup.

16. The method of claim 14 wherein $\Delta V/V$ is determined by substantially the following equation:

$$\frac{\Delta V}{V} = \sum_i 2 W_i t_{deposit} \left( \frac{1}{D(1-f_i^2)} - \frac{2}{L_i} \cdot \frac{c - c_{deposit}}{c_{deposit}} \right)$$

wherein i refers to a chord between the upstream and the downstream transducers; $t_{deposit}$ is the thickness of the deposit buildup; D is the inner diameter of the ultrasonic flow meter in the absence of deposit buildup; $W_i$ is a chord-dependent weighting factor for chord i; $L_i$ is the length of chord i in the absence of deposit buildup; f is the relative fractional distance between a plane containing the chord i and a plane through the center of the ultrasonic flow meter; c is the speed of sound through the fluid; and $c_{deposit}$ is the speed of sound through the deposit.

17. A non-transitory computer-readable media comprising a plurality of instructions that, when executed by a processor, cause the processor to:
   determine diagnostic data based on acoustic signals transmitted between a transducer pair of an ultrasonic flow meter, the diagnostic data comprising a speed of sound through a fluid flowing through the flow meter;
   determine a trend of the speed of sound through the fluid; and
   detect deposit buildup within the ultrasonic flow meter based on the trend.

18. The computer-readable media of claim 17 wherein the instructions further cause the processor to determine the thickness of deposit buildup.

19. The computer-readable media of claim 18 wherein the instructions further cause the processor to generate a signal when the thickness of the deposit buildup exceeds a threshold value.

20. The computer-readable media of claim 17 wherein the instructions further cause the processor to calculate a volumetric flow rate through the ultrasonic flow meter as a function of the deposit buildup thickness.

* * * * *